United States Patent [19]
Miyawaki et al.

[11] Patent Number: 5,500,712
[45] Date of Patent: Mar. 19, 1996

[54] METHOD AND EQUIPMENT FOR PRINTING 3-D STEREOGRAPH

[75] Inventors: Hiroshi Miyawaki, Wakayama; Mitsuhiko Itojima, Naga; Takayuki Oka, Wakayama; Kazuyoshi Yamamoto, Kainan; Toshiro Akira, Wakayama; Masaaki Tsuji, Hannan, all of Japan

[73] Assignee: Noritsu Koki Co., Ltd., Wakayama, Japan

[21] Appl. No.: 199,222

[22] PCT Filed: Jun. 29, 1993

[86] PCT No.: PCT/JP93/00890
§ 371 Date: Feb. 28, 1994
§ 102(e) Date: Feb. 28, 1994

[87] PCT Pub. No.: WO94/00798
PCT Pub. Date: Jan. 6, 1994

[30] Foreign Application Priority Data

Jun. 30, 1992 [JP] Japan .................. 4-195974
Jul. 2, 1992 [JP] Japan .................. 4-199209

[51] Int. Cl.⁶ .................................................. G03B 27/32
[52] U.S. Cl. .................................................. 355/22
[58] Field of Search ..................................... 355/22

[56] References Cited

U.S. PATENT DOCUMENTS

| | | | |
|---|---|---|---|
| 3,895,867 | 7/1975 | Lo et al. | 355/77 |
| 3,960,563 | 6/1976 | Lo et al. | 355/22 X |
| 4,101,210 | 7/1978 | Lo et al. | 355/22 X |
| 4,120,562 | 10/1978 | Lo et al. | 355/22 X |
| 4,132,468 | 1/1979 | Lo et al. | 355/22 X |
| 4,650,282 | 3/1987 | Lo | 355/22 X |
| 4,800,407 | 1/1989 | Lo | 355/22 X |
| 4,852,972 | 8/1989 | Lo | 355/22 X |
| 4,903,069 | 2/1990 | Lam | 355/22 |
| 5,028,950 | 7/1991 | Fritsh | 355/22 |
| 5,111,236 | 5/1992 | Lo | 355/22 |

FOREIGN PATENT DOCUMENTS

| | | |
|---|---|---|
| 58-7981 | 2/1983 | Japan . |
| 2-248943 | 10/1990 | Japan . |

*Primary Examiner*—Michael L. Gellner
*Assistant Examiner*—D. P. Malley
*Attorney, Agent, or Firm*—Lowe, Price, LeBlanc & Becker

[57] ABSTRACT

A negative detection device comprising the likes of a CCD camera and line sensors is incorporated in a 3D photographic printing apparatus in which a lenticular sheet is used. The negative detection device measures the positional shift of the key subject of the 2D negative. If the key subject shift exceeds a predetermined threshold value, a correction is introduced to regulate the spacial parallax of a background object. If the key subject shift is less than a predetermined threshold value a correction is introduced to regulate the spacial parallax of a foreground object. Exposure is performed after positional adjustments are made.

1 Claim, 16 Drawing Sheets

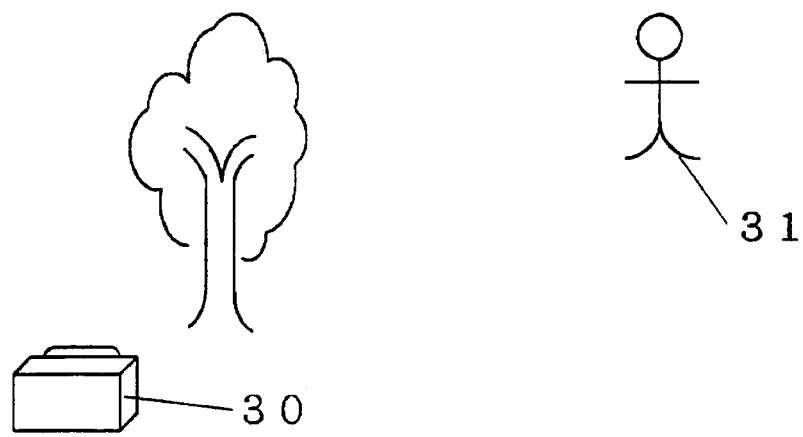
F I G. 15
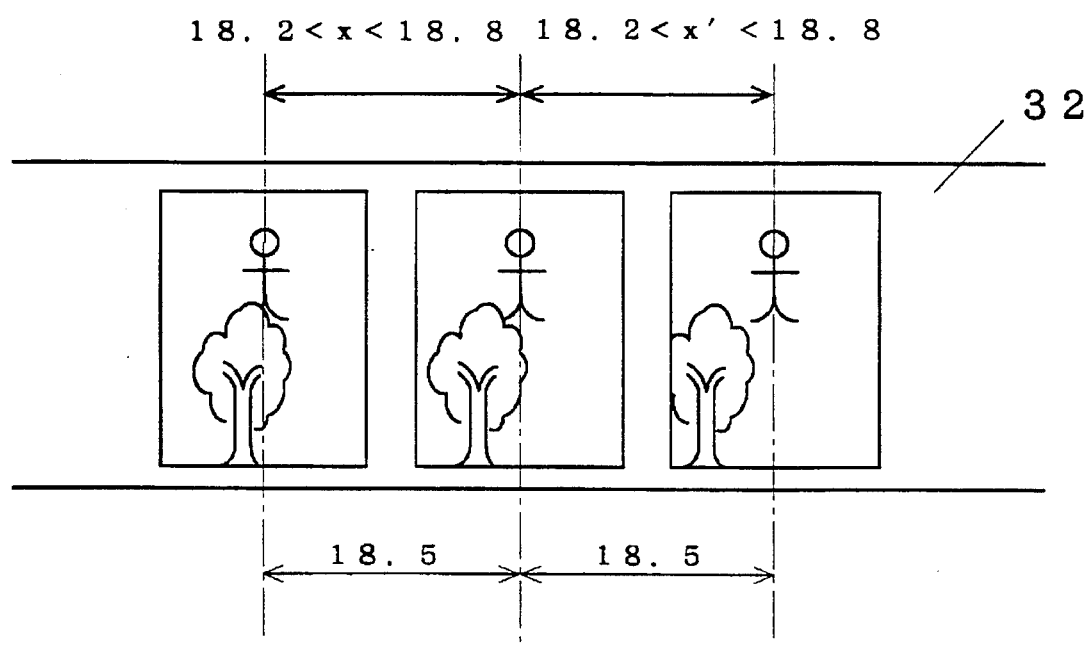
F I G. 16

1

METHOD AND EQUIPMENT FOR PRINTING 3-D STEREOGRAPH

TECHNICAL FIELD

This invention relates to methods and apparatuses for printing of three dimensional (3D) photographs. More particularly, the invention relates to means for executing exposure control and exposure-position rectification in methods and apparatuses for printing of three dimensional (3D) photographs, in accordance with the differences in spacial parallax.

BACKGROUND ART

As a general method for preparing 3D photographs, there is the indirect method in which a multiple of negatives are prepared in advance for a single object, that has a depth and that comprises a principal object, a foreground and background, using a camera containing more than three lenses, the negatives being repetitively printed for more than three times onto a photosensitive sheet containing a lenticular sheet and the photographic angle being changed for each negative.

FIG. 1 illustrates the 3D photographic method. The figure shows the case of a triple-lens camera consisting of the lenses 1, 2 and 3, in which the arrows marked with L and L' show the spans between the observation points while X and Y show respectively the parallaxes between the principal object 5 and background 4 and the principal object 5 and foreground 6.

For instance, if the principal object 5 and background 4 are compared, there are parallaxes of –X on the first print, 0 on the second print and +X on the third print for each of the photographing stations. If the principal object and foreground are compared, there are parallaxes of +Y on the first print, 0 on the second print and –Y on of the third print. Negatives that have different positions of the images of the principal object, foreground and background are prepared from the photographing stations that are located either on a straight line parallel to the object or a line drawn through the center of the object.

The prepared negatives are projected and printed onto a photosensitive lenticular sheet, which consists of a sheet that acts as a lenticular lens and that is coated on the back side with a photosensitive material, from the side of lenticular lens in the order of photographic stations starting from one negative frame to the end of other frames.

When printing is to be done, a part of the principal object is selected as the key-subject, and exposure is executed with positions adjusted so that the key-subject for the images in each negative are coincident. If printing is done with the photographic angle changed for each negative, the images in each negative become separated into a band pattern by the lenticular lenses, and an image band that has a width in proportion to the photographic angle is repetitively arranged in correspondence with the photographic direction.

The formation of a three dimensional image is explained considering as an example the case of a 3D photograph, which was prepared by a single exposure, one each of the 3-frames of a negative being pictured with a triple-lens camera for 3D use. FIG. 2 illustrates an example of a conventional 3D photograph.

The image band formed on the photosensitive layer as shown in the figure is expanded sideways by the lenticular lens and will be seen as a restored image, and different restored images of the two image bands corresponding to different photographic stations will reach the left and right eye of an observer. A three dimensional view is obtained from the superimposition of different image information reaching the left and right eyes of the observer.

In the figure, the right eye receives the image 2 in the center while the left eye receives the image 1 on the right. The image band 2 covers 9° while the image bands of 1 and 3 each covers 7° of the filed of view, and the three dimensional view is obtained in the 23° viewing region in front of the 3D photograph.

The three dimensional effect will differ depending on which photographic station corresponds to the negative, the restored images of which will reach the left and right eyes of the observer. In the event when the photographic stations are different, namely when two image bands of larger observation spans are combined, the three dimensional effect will improve, but because the spacial parallax of the images that enter the left and right eyes is large, this large difference in the image information received by both eyes will be interpreted either as being out-of-focus or as a wrong vision and causes a degradation in the photographic quality.

Consequently, the printing apparatus is arranged in such a manner as the image bands being seen by both of the eyes are ordinarily those that are printed at the bandwidth and band pattern at the photographic angle for which the combination of neighboring negatives have the least the observation span. In addition, one part of the principal object, which is more important in comparison with the background and foreground objects, is specified as the key-subject, and exposure is performed so that the key-subjects of each of the frames of a negative are coincident.

Contrary to conventional photography, in 3D photography, three dimensional effects are in demand more than such photographic characteristics as the color, contrast and sharpness. In order to obtain the three dimensional effect, although it is appropriate to increase the observation span, when an image with a large observation span enters both of the eyes it is likely that an out-of-focus situation or a wrong vision will occur. In conventional 3D photographic printing apparatuses, to prevent the out-of-focus situation and a wrong vision from occurring, the image band is formed so that a combination of negatives with the least observation span enters the left and right eyes of the observer.

Using a multi-lens compact camera for 3D use where the lens spacing is fixed, and especially when a personnel having no special technical skill is photographing, a photographic composition of appropriate sense of depth of foreground and background is not always guaranteed and can even finish in one with a poor perspective.

FIG. 3 shows an example of a conventional 3D photograph. Despite the fact that each of the frames of a negative are photographed with an appropriate spacial parallax, the right and left eyes of a observer will catch the image bands that are not neighboring and will not be able to appreciate the appropriate spacial parallax. If more than 4 image-bands are printed using a multiple of photographing stations from prepared negatives consisting of more than 4 frames, due to the fact that the view angle covered by a single image band is small, the right and left eyes of an observer will catch the image bands that are not neighboring depending on the observer's location, and that will result in an out-of-focus situation or a wrong vision.

If an object of poor perspective effect or a small spacial parallax is to be photographed, a 3D photograph of the object prepared with conventional printing methods will not sufficiently produce a three dimensional effect. The present invention thus has the objective of realizing a 3D photographic printing method, wherein a desired spacial parallax is obtained, said photographic method producing 3D photographs of excellent three dimensional effects.

Depending on the photographic object, not only the depths of the foreground and background, the relationship of the positions of the foreground object, the principal object and the background object will also be different, in addition the spacial parallaxes of the foreground, principal and background objects not being fixed.

If for instance, a composition of the principal object located in the foreground is to be photographed, despite the fact that the parallax between the principal object and the foreground object is slight, that between the principal object and the background object is extremely large. In conventional 3D photographic printing apparatuses, where a part of such a principal object is selected as the key-subject and exposure is performed so as to make such key-subjects definitely coincident, the parallax of the background object will become too large that an out-of-focus situation will arise in the background.

Contrarily, when a composition of the principal object located in the background is photographed, despite the fact that the parallax between the principal object and the background object is slight, that between the principal object and the foreground object becomes extremely large. When a part of such a principal object is selected as the key-subject and exposure is performed so as to make such key-subjects definitely coincident, the parallax of the foreground object will become too large that an out-of-focus situation will arise in the foreground.

When a prepared 3D photograph is viewed in a situation where the parallax is extremely large as above, it is only possible to grasp distinctively the neighborhood of the key-subject of the principal object, and as a whole, the photograph will lose its finish and three dimensional effect. The present invention has the objective of providing 3D photographs of excellent finish by obtaining a 3D photographic printing apparatus that takes account of the differences in the spacial parallaxes among the foreground object, the principal object and the background object.

DISCLOSURE OF THE INVENTION

1) In order to obtain an excellent three dimensional effect, in the present invention the parallax of each of the frames of the negatives which construct a 3D photograph is measured for determining the depths of the foreground object, principal object and the background object resulting from the variation in the parallax due to the photographic location, and based on those results, an image band is prepared which has a bandwidth and band pattern resulting in the optimum three dimensional effect for the combination of the negatives which have different observation spans.

In order to determine the spacial parallax, a negative-detecting device comprising a CCD camera and line sensors and the like is incorporated in the printing apparatus, and with each of the negative frames inserted the spacial parallax is determined from the specification of the coordinates on a TV monitor.

In the event the variation in the spacial parallax due to the photographic location is small, an exposure pattern is obtained that forms an image band having a bandwidth and band pattern resulting in a three dimensional effect from the combination of negatives of large observation spans.

In the event the variation of the spacial parallax is sufficient, exposure is performed at the regular bandwidth and band pattern for which the observation of 3D vision is possible for the combination of the negatives of small observation span obtained at adjoining photographic stations.

2) In order to improve the finish of 3D photographs, in the 3D printing apparatus of the present invention, shift in the key-subject belonging to the principal object of each of the negatives is determined and corrected based on those results. In case the shift in the key-subject belonging to the principal object exceeds a threshold value, by judging the fact that the principal object is in the foreground a correction is introduced so as to regulate the parallax with the background object, and after position adjustments are made the exposure is performed.

Contrarily, when the shift in the key-subject belonging to the principal object is below the threshold value, by judging the fact that the principal object is in the background a correction is performed so as to regulate the parallax with the foreground object, and after position adjustments are made, exposure is performed. Even in such photographs as scenic photographs where a principal object can not be specified, the correction is introduced by selecting an arbitrary position as the key-subject and measuring the shift. In order to measure the key-subject belonging to the principal object, a negative-detecting device that consists of such items as a CCD camera and line sensors and that is incorporated into the 3D photographic printing apparatus is used.

1) Below is a description of printing methods and apparatuses of 3D photographs for excellent three dimensional effect. FIGS. 4 and 5 show the flow chart of the program to be incorporated in the present inventive 3D photographic printing apparatus. The flow charts of FIG. 4 and 5 are connected together at the symbol S. In this example, the parallax is estimated with reference to a single point on the principal object.

As show in the figure, after establishing the initial settings of the positions of the CCD camera and exposure station, an image on one negative that is to become the reference image is photographed and the coordinates of the reference point are registered in memory. Next, the remaining image on the negative is photographed as the image for comparison, and the coordinates of the reference points for the images on each of the negatives are also registered in memory. In the event the shift in the positions of the reference points obtained from coordinates exceeds a preset threshold value, the observation span of adjoining negatives are large for the spacial parallax to be judged as adequate, and exposure is performed with the exposure pattern that will result in a three dimensional effect for the combination of the negatives of the adjoining photographic stations.

In the event the shift in the positions of the reference points obtained from the coordinates is below the threshold value, the observation span of adjoining negatives are small and the spacial parallax is judged to be inadequate. Exposure is then performed with the exposure pattern that will result in a three dimensional effect for the combination of the negatives of far-apart photographic stations of the sequence so that the spacial parallax is larger and a photograph of excellent three dimensional effect is produced.

FIG. 6 shows a schematic diagram of one example of the present inventive 3D photographic printing apparatus. The apparatus generally consists of: an exposure section that comprises such items as a light source, a lens, an exposure station and their driving devices; an image processing section that has such functions as photographing, processing and displaying functions; and a computer for control purposes comprising a CPU, ROM and RAM; and in addition an I/O, a circuit for the purpose of executing input/output dealings.

The negative 7 is photographed using the CCD camera 11 and projected onto the television monitor 13 via the image processing section 12. Using a track ball 14 to move a cursor on the television monitor, it is possible to specify a position on the television monitor. The image processing section 12 transmits the coordinates specified by the cursor to a connected computer, where the shift in the image of each frame of the negative is computed and the spacial parallax determined.

In the example shown in the figure, the exposure lens 15 and CCD camera 11 are mounted on an identical plate, and connected to which are the two motors 16 and 17 that move the lens and the camera in two perpendicular directions. The exposure station 28 also is mobile and has a motor 18 for moving the same. The motors 16 and 17 for moving the lens and camera and the motor 18 for the exposure station are each connected via respectively the drive circuits 19 and 20 to the control computer comprising CPU 25, ROM 26 and RAM 27. In addition, the keyboard 24 that is used for operating the computer and the display 23 are each connected to the computer via the I/O ports 21 and 22 in the same manner as the drive circuits 19 and 20.

The apparatus of the present invention captures each of the frames of negatives, computes the changes in the coordinates of a reference point specified by a cursor on the screen of a television monitor, and changes the photographic angel and the printed band pattern in the event the parallax is judged to be small so that the combination of the negatives having a larger observation span is used to produce three dimensional effect.

For example, in the case of 3D photographic preparation in which a negative of 3-frames each having a small spacial parallax is photographed 3 times, exposure is executed in the exposure pattern for which the bandwidth between the two extreme image bands become larger.

FIG. 7 shows a diagram for explaining one example of a photograph printed with the present inventive 3D photographic printing apparatus. As shown in the figure, due to the fact that the image bands of the two extremes (1) and (3) easily contain the optic angle, when viewed from the front, both eyes will receive restored images of (1) and (3), which are due to the combination of negatives of larger observation span and an excellent 3D photograph is produced.

In addition, as shown above in FIG. 3 as another example, considering the case of 3D photographic preparation in which a negative of 4-frames is photographed 6 times to prepare 6 image bands, with conventional printing methods the image bands (1) and (3), which are not adjoining, will reach both eyes of the observer although each frame has an appropriate spacial parallax, and exposure is performed by having changed the exposure pattern even if an out-of-focus situation is to occur.

FIG. 8 shows a diagram for explaining yet another example of a photograph printed with the present inventive 3D photographic printing apparatus. By changing the band patterns of FIG. 3 to those in FIG. 8, the restore images of the image bands (2) and (3) will reach the eyes of the observer and an excellent three dimensional photograph is obtained. Contrarily, when the spacial parallax of each of the frames is too small, a band pattern such as that in FIG. 3 is printed, and the restored images of the image bands (1) and (3) are made to reach the eyes of the observer to obtain an excellent 3D photograph.

(2) Below is a description of printing methods and apparatuses for obtaining 3D photographs of excellent finish. FIGS. 9 and 10 show the flow chart of the program for the detection of negatives and the control of exposure station position in the present inventive 3D photographic printing apparatus. The symbol S in the figures indicates the fact that the flow charts are connected.

Threshold value of the shift and the origin of the coordinate axes are specified as the initial settings, and having specified the key-subject position of the reference image the coordinates and the data at the key-subject position are input. From the comparison image, the image at the key-subject location is referenced and the coordinates of the key-subject of the comparison image obtained. By comparing the coordinates of the key-subjects of the reference image and image of comparison, the amount of shift is computed, and if the threshold value has been exceeded, a uniform value of correction is added to the each of the shifts and the exposure position recalculated. Complied with the corrected exposure position, the lens, negative and the exposure station or the like are moved, and the exposure is appropriately done.

One example of the method used for computing the correction in the present inventive 3D photographic printing apparatus is described. When 3-frame negatives are arranged with 18.5 mm pitch, the correction is performed based on the fact that the shifts greater than 1 mm or less than 0.3 mm constitute the impermissible range of shifts. When the condition, $0.3 \text{ mm} \leq 1$ (the horizontal distance between the key-subject of the reference image and the key-subject of the comparison image)— $18.5 | \leq 1$ mm is satisfied, the amount of shift is considered to be permissible, and the exposure is performed without any correction, coinciding the key-subjects.

When the condition, l (the horizontal distance between the key-subject of the reference image and the key-subject of the comparison image)—18.5l>1 mm is satisfied, by considering the horizontal distance between the key-subject of the reference image and the key-subject of the comparison image as 19 mm the superimposing is executed. When the condition, l (the horizontal distance between the key-subject of the reference image and the key-subject of the comparison image)—18.5l<0.3 mm is satisfied, by considering the horizontal distance between the key-subject of the reference image and the key-subject of the comparison image as 18.8 mm the superimposing is executed.

One example of printing using the present inventive 3D photographic printing apparatus is described. As shown in FIG. 11, when viewed from the camera 30 the principal object 31 is extremely close and the key-subject position on each image will vary markedly resulting in a large shift.

As shown in FIG. 12, despite the fact that the frames of the negative have a pitch of 18.5 mm, the decision is made to introduce a correction because, with respect to the reference image the key-subject of the comparison image is either located at a position below the initial input-setting, 17.5 mm (namely, l17.5–18.5l>1 mm), or at a position exceeding 19.5 mm (namely, l19.5–18.5>1 mm).

When printing is performed using a conventional 3D photographic printing apparatus, as shown in FIG. 13, parallax of the background becomes so large that an out-of-focus situation will arise. When printing is performed using the present inventive 3D photographic printing apparatus, as shown in FIG. 14 the photographic finish will improve because it is possible in the present invention to regulate the spacial parallax as a whole becoming extremely large.

As shown in FIG. 15, in the case when the principal object is in the extreme background, the key-subject position in each of the images does not vary and the shift is hardly existent. As shown in FIG. 16, despite the fact that the frames of the negative have a pitch of 18.5 mm, the decision is made to introduce the correction because, with respect to the reference image the key-subject position of the comparison image is located within the threshold range, 18.2 to 18.8 (namely, |18.2−18.5|<0.3 mm or |18.8−18.5|<0.3 mm).

When printing is performed using a conventional 3D photographic printing apparatus, as shown in FIG. 17, the parallax of the foreground becomes so large that an out-of-focus situation will arise. When printing is performed using the present inventive 3D photographic printing apparatus, as shown in FIG. 18, the photographic finish will improve because it is possible in the present invention to regulate the spacial parallax as a whole becoming extremely large.

In situations where the principal object can not be specified as in scenic photographs, the amount of shift is measured by specifying an arbitrary position as the key-subject. Generally, it is appropriate to specify the key-subject on the foremost object in the fore-sight out of the entire objects. In addition, it is also appropriate to fix the key-subject in advance, and in which case it is effective to place the key-subject in the central image region.

As described above, by using an exposure pattern consisting of image bandwidth and band pattern that differ in accordance with the spacial parallax of the image obtained at each of the photographic station, it is possible in the present inventive 3D photographic printing apparatus to prepare a photograph that create a restored image having a suitable spacial parallax in the eyes of an observer.

The out-of-focus condition resulting from spacial parallax being extremely large is resolved, and three dimensional effects can be controlled by supplementing the inadequacies in the depth of the background and foreground. Additionally, utilization of the present inventive printing apparatus has the advantage that 3D photographs emphasizing the 3D effect can be produced.

By utilizing the present inventive 3D photographic printing apparatus, it is possible to produce photographs with a minor focal-point blurring by means of regulating to a suitable value the spacial parallax of either the background or the foreground that results when the principal object is located more closer to foreground or to the background. Although there was a tendency in 3D photography for photographing only objects of a specific composition, the present invention has the advantage that, irrespective of the positions of the principal object, background object and the foreground object, excellent 3D photographs can be produced by using the present inventive 3D photographic printing apparatus, even of the likes of scenic views.

BRIEF DESCRIPTION OF DRAWINGS

FIGS. 11 to 19 illustrate one example of printing using the present inventive 3D photographic printing apparatus;

BEST MODE FOR CARRYING OUT THE INVENTION

Figure 1:
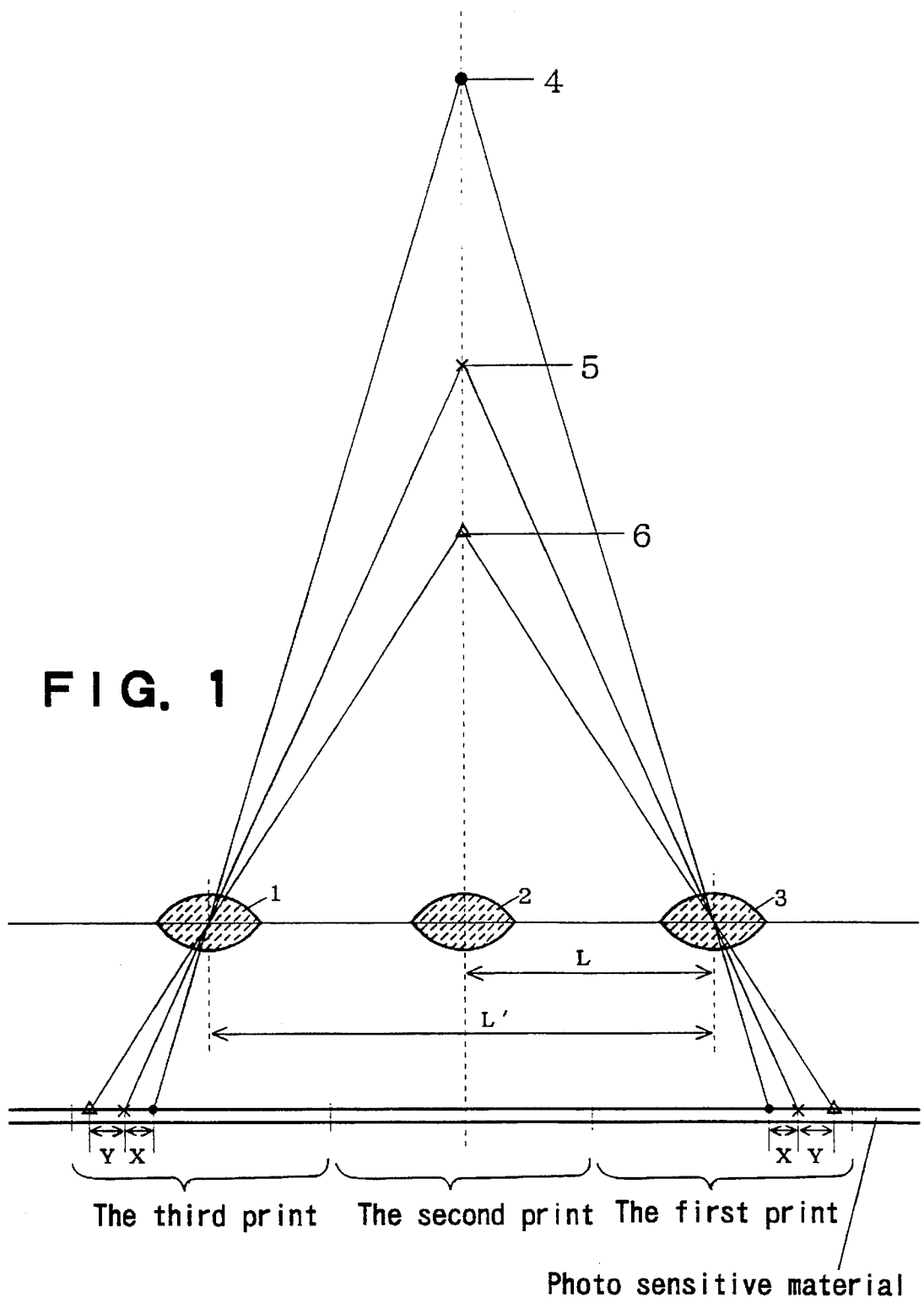
FIG. 1 illustrates the 3D photographic method.
Figure 2:
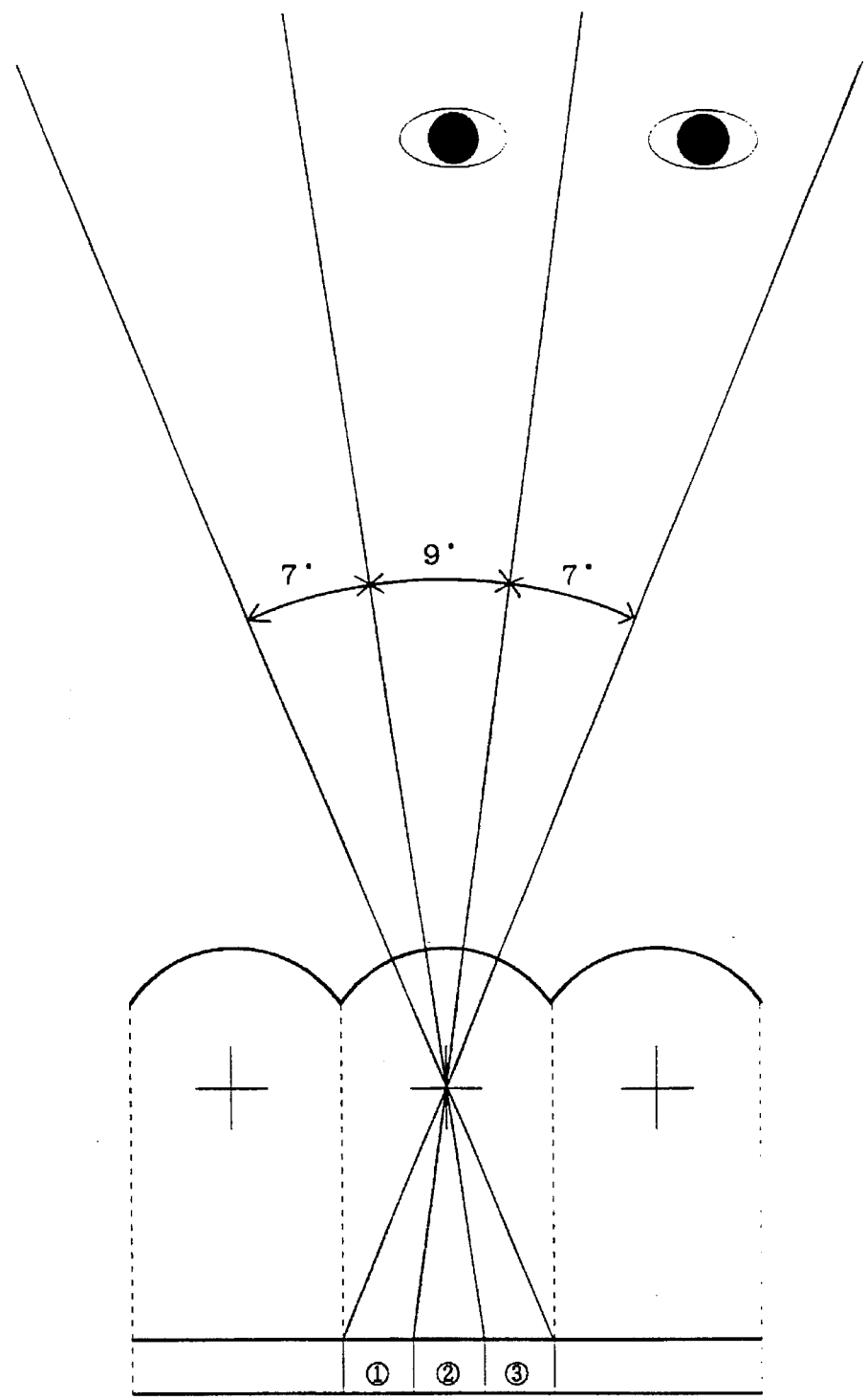
FIG. 2 illustrates a photograph printed with a conventional 3D photographic printing method.
Figure 3:
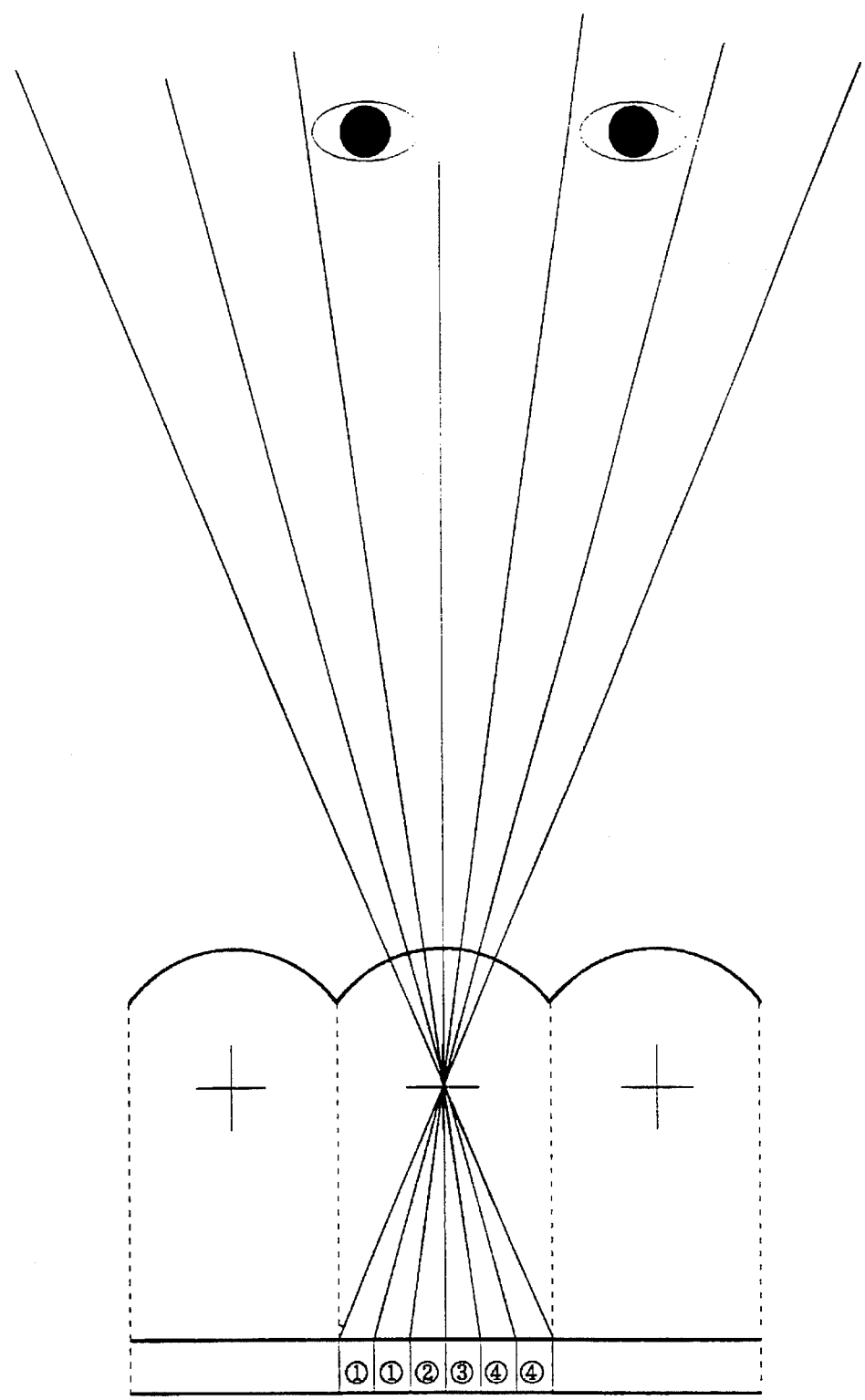
FIG. 3 illustrates an example of a conventional 3D photograph.
Figure 4:
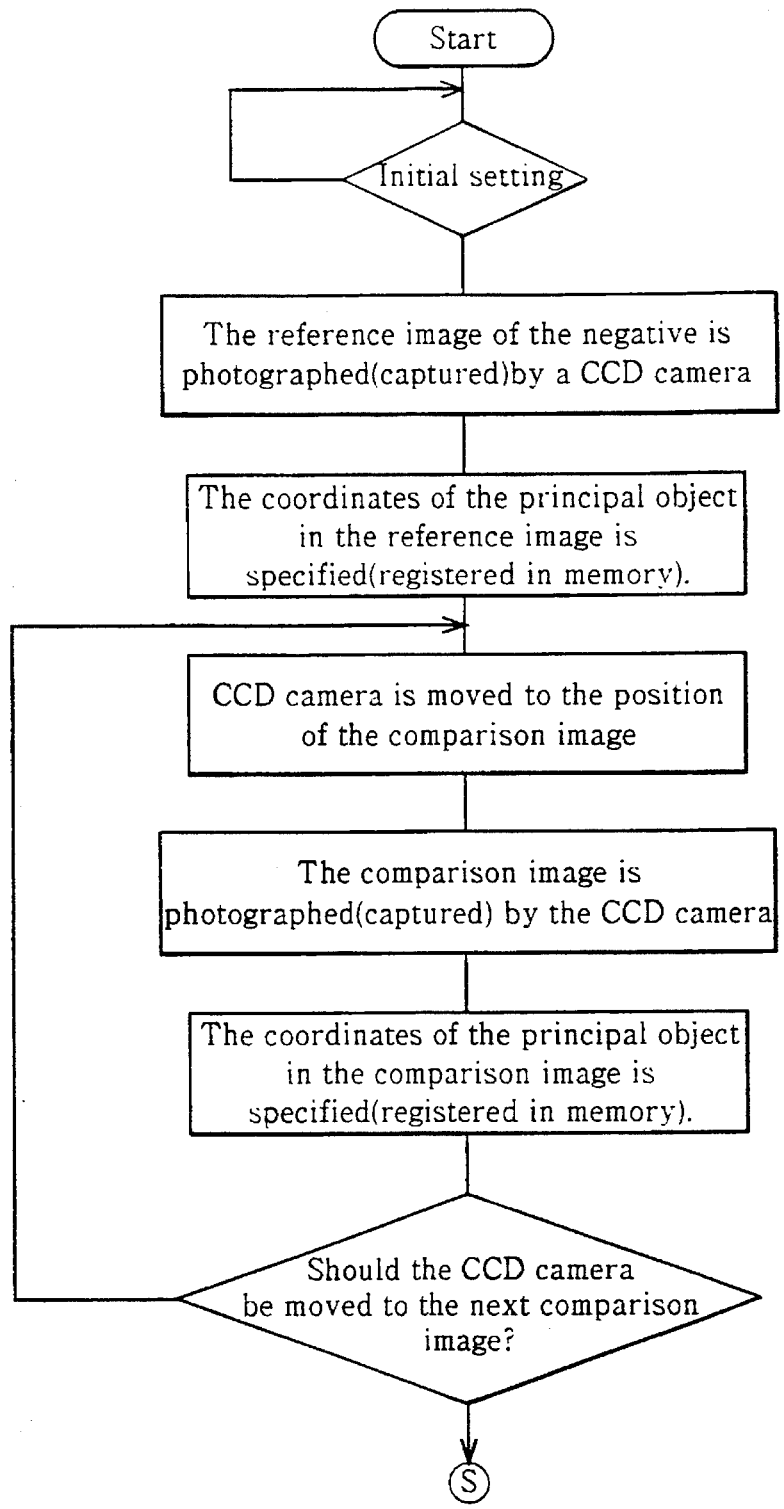
FIGS. 4 and 5 illustrate the flow chart of the program to be incorporated in the present inventive 3D photographic printing apparatus.
Figure 5:
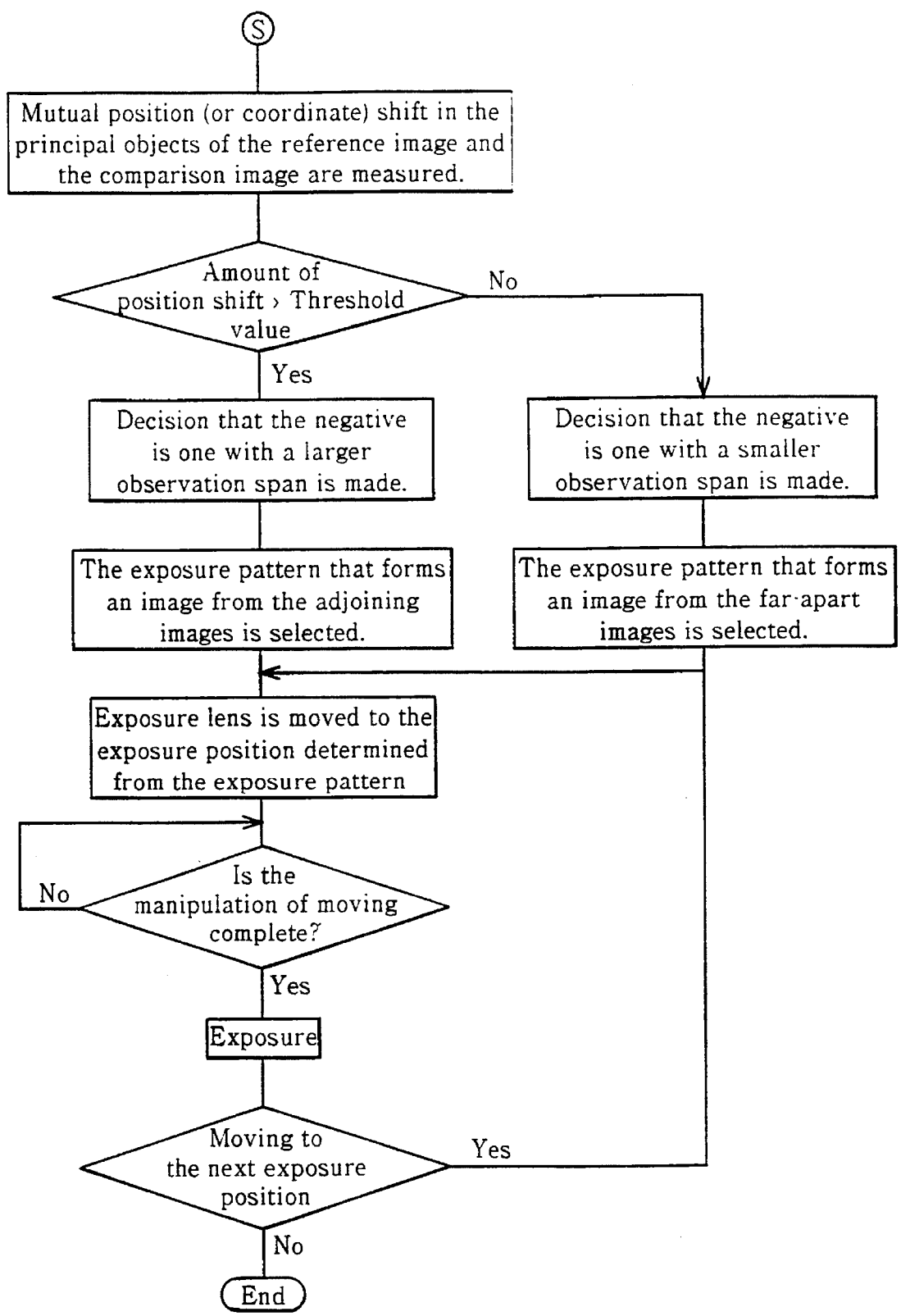
Figure 6:
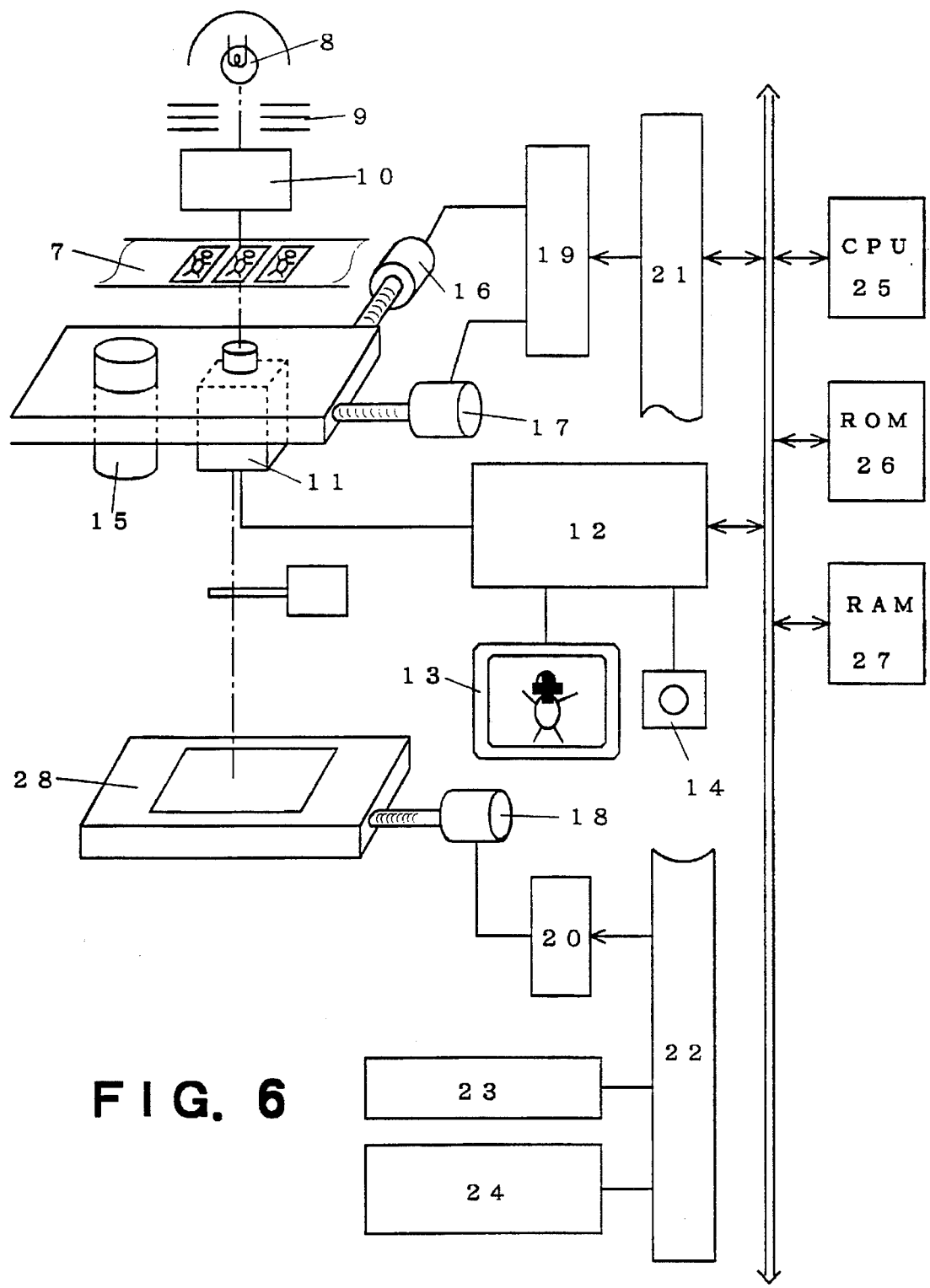
FIG. 6 shows a schematic diagram of one example of the 3D photographic printing apparatus of the present invention.
Figure 7:
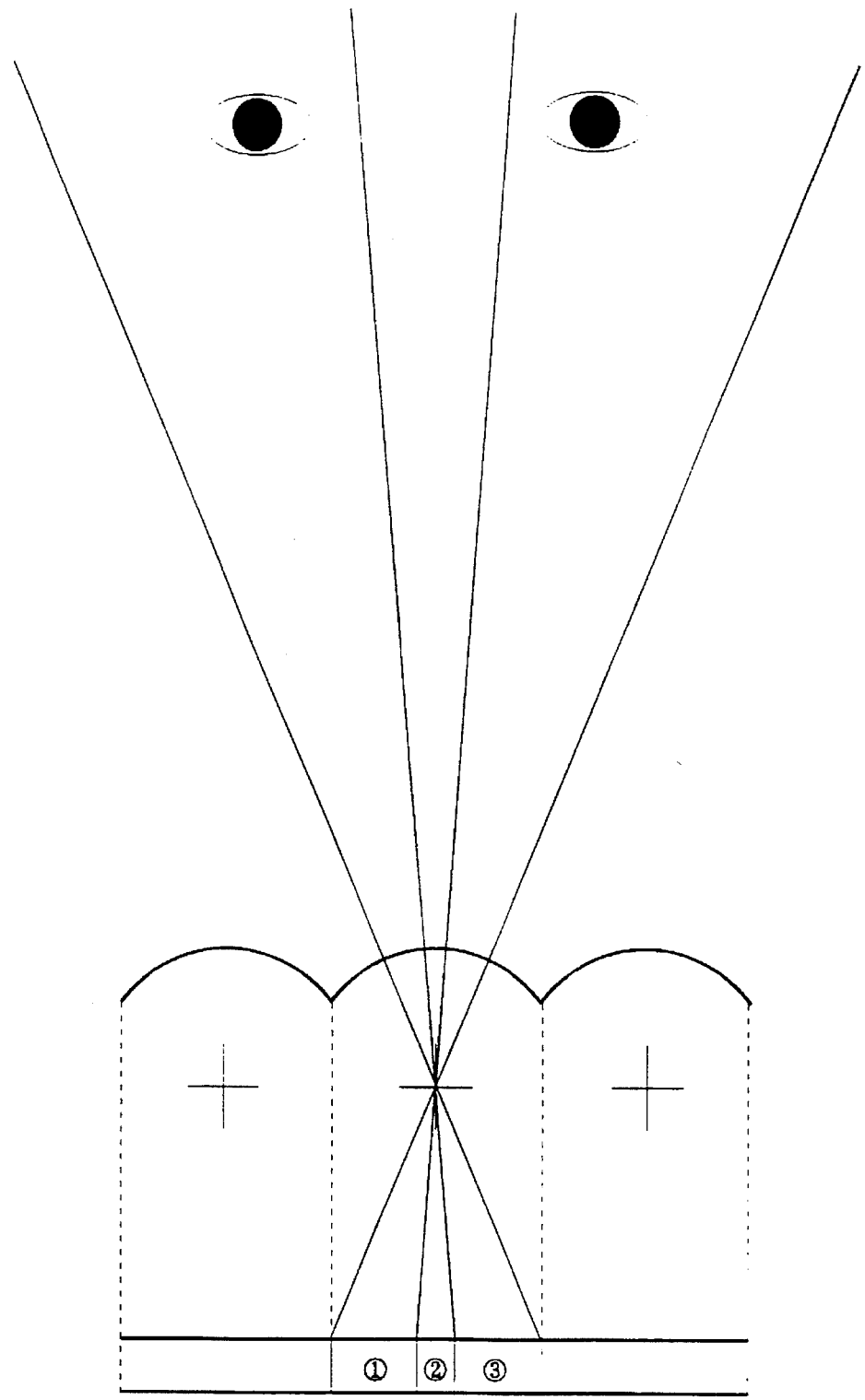
FIG. 7 illustrates the printing of a 3D photograph in the present invention.
Figure 8:
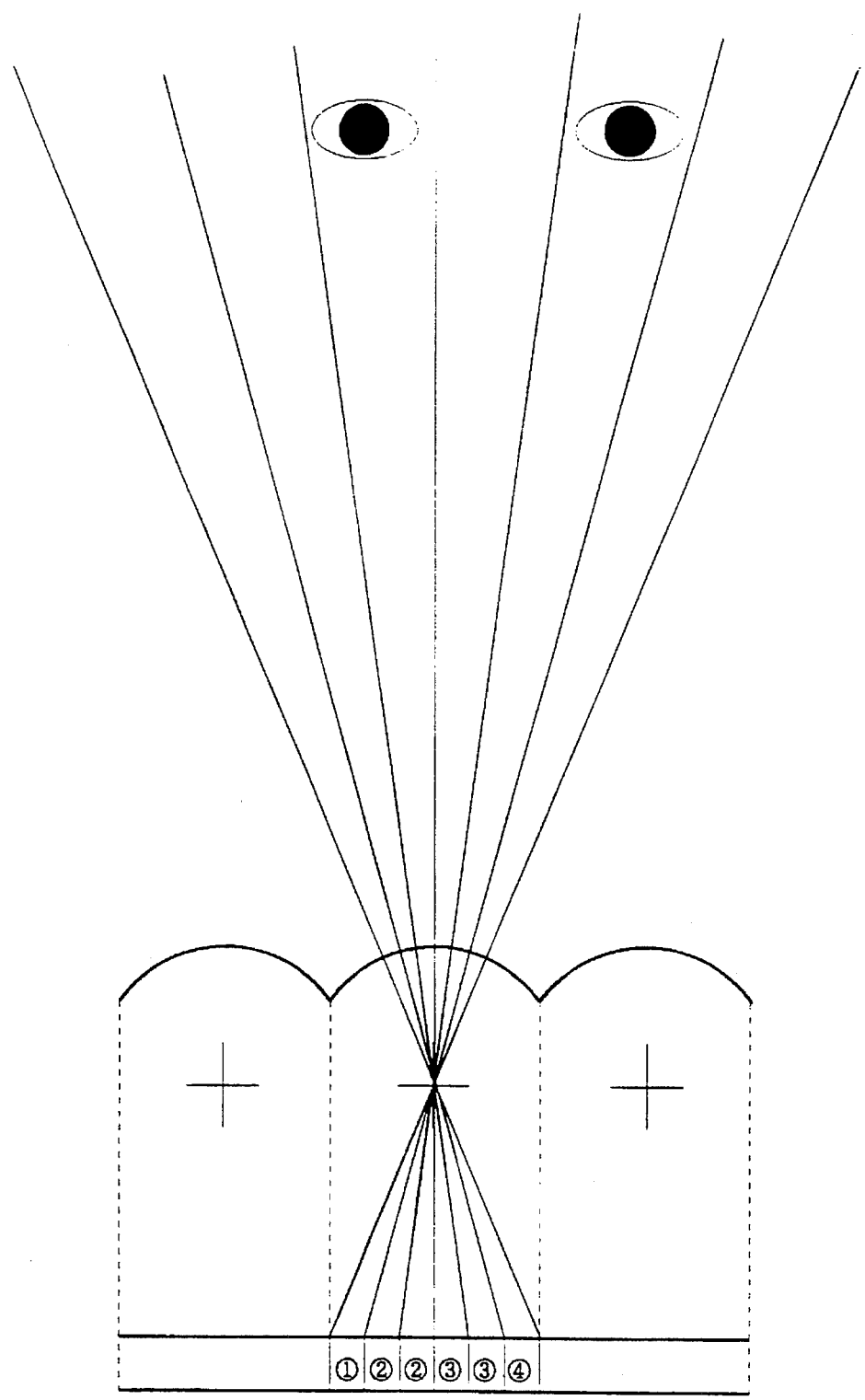
FIG. 8 illustrates one example of a photograph printed with the present inventive 3D photographic printing apparatus.
Figure 9:
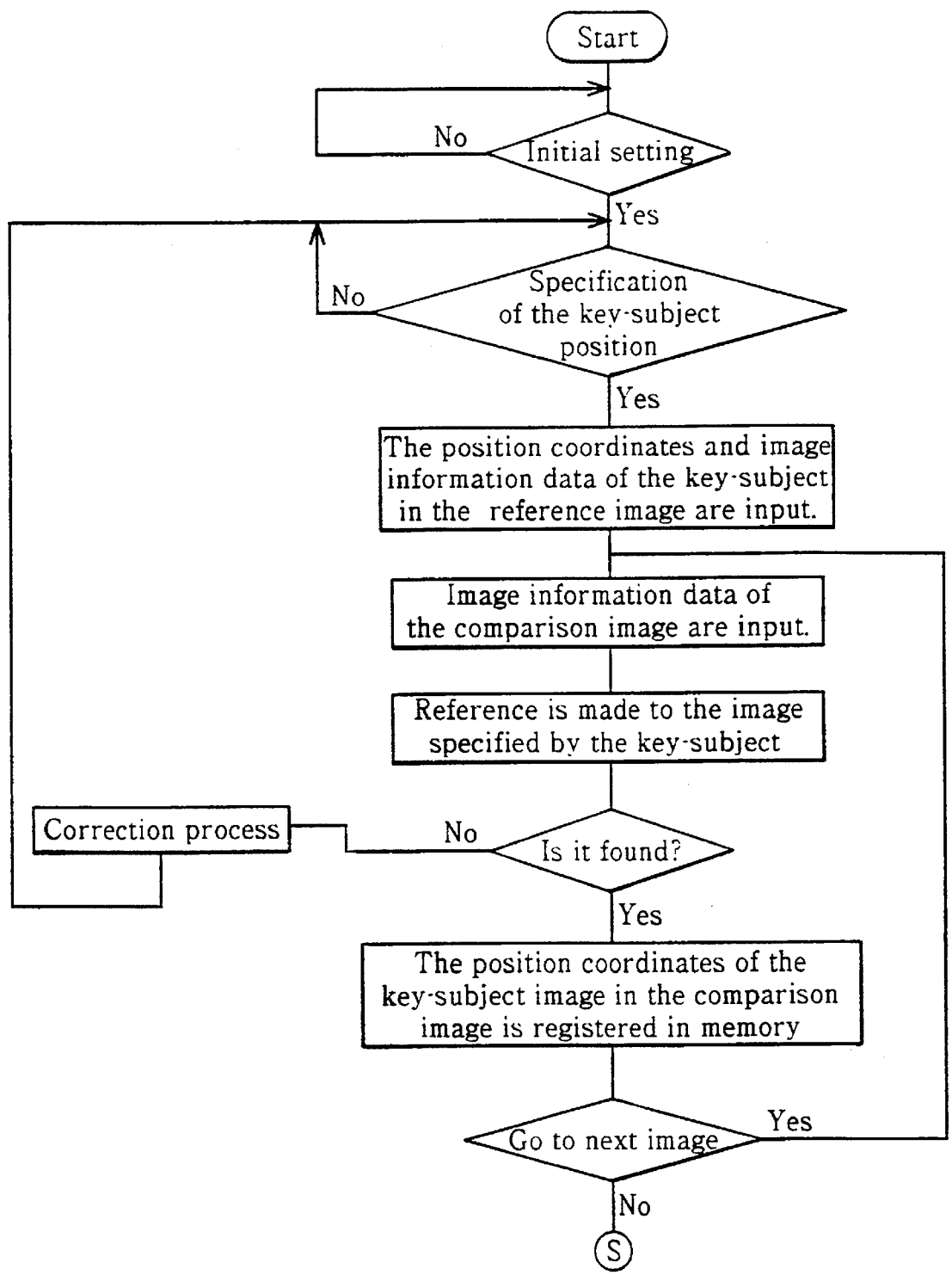
FIG. 9 and 10 show the flow chart of the program for controlling the present inventive 3D photographic printing apparatus.
Figure 10:
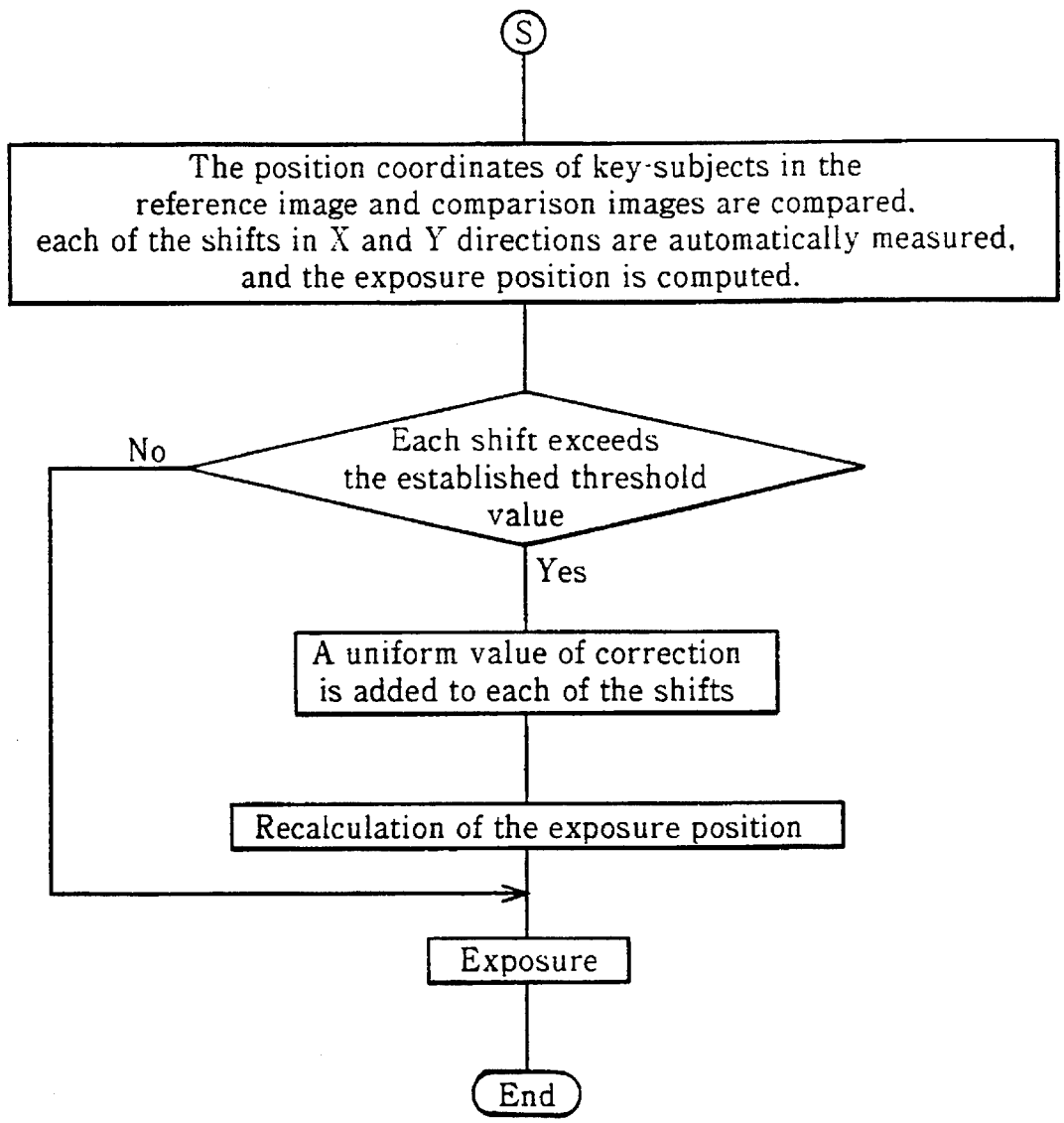
Figure 11:
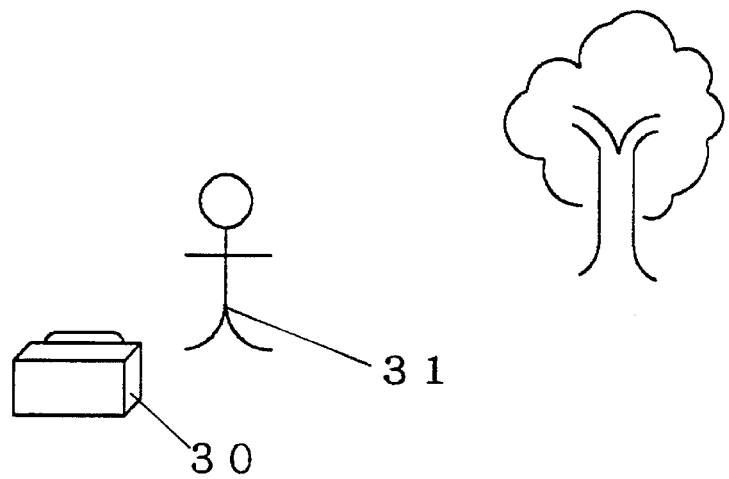
Figure 12:
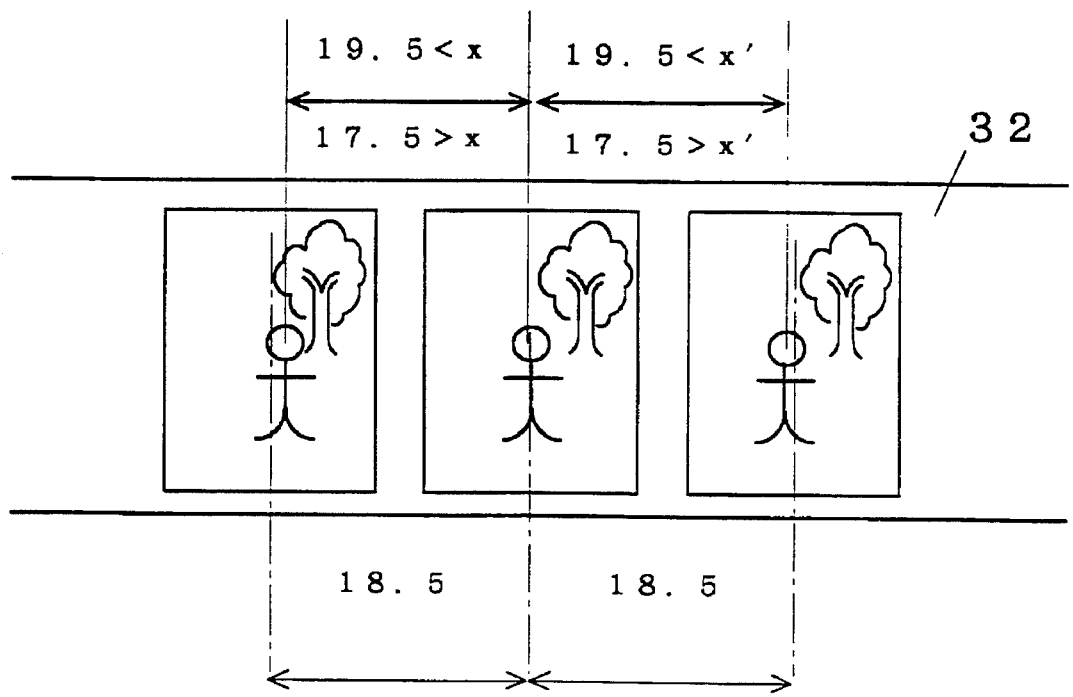
Figure 13:
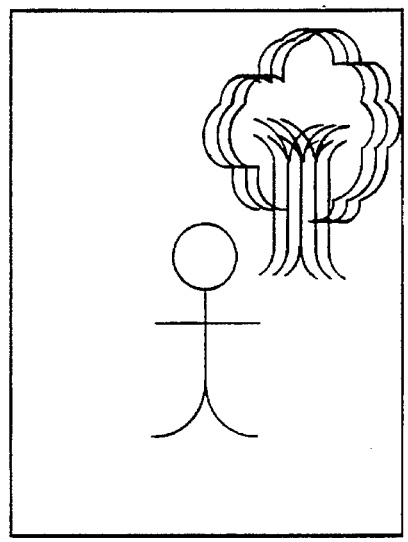
Figure 14:
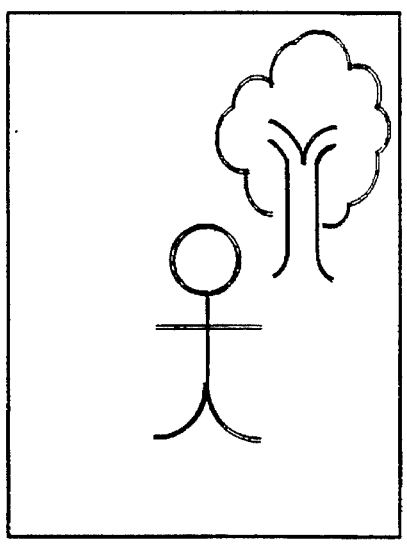
Figure 17:
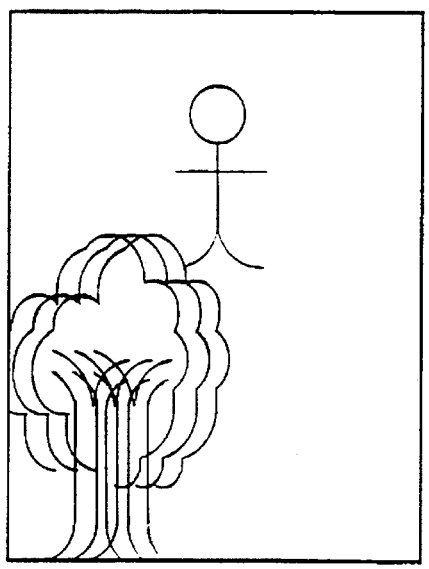
Figure 18:
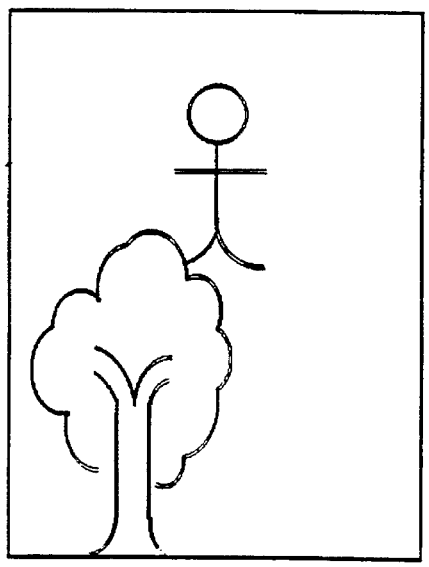
Figure 19:
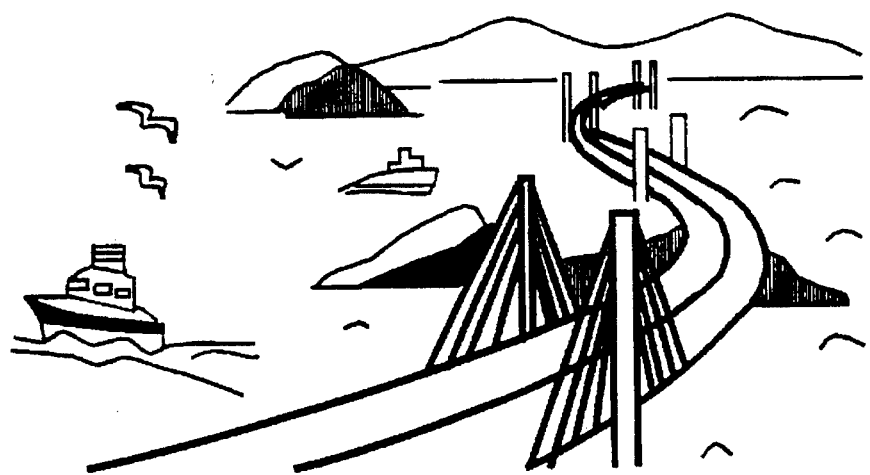
Figure 19:
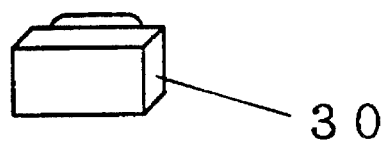
Figure 20:
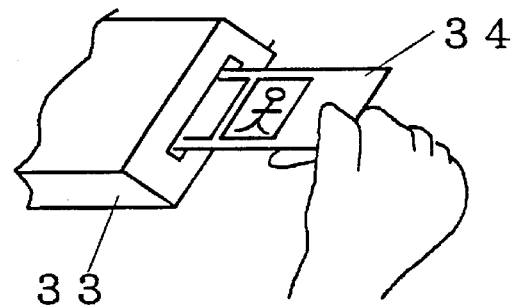
FIG. 20 illustrates one embodiment of the present inventive 3D photographic printing apparatus.
Figure 21:
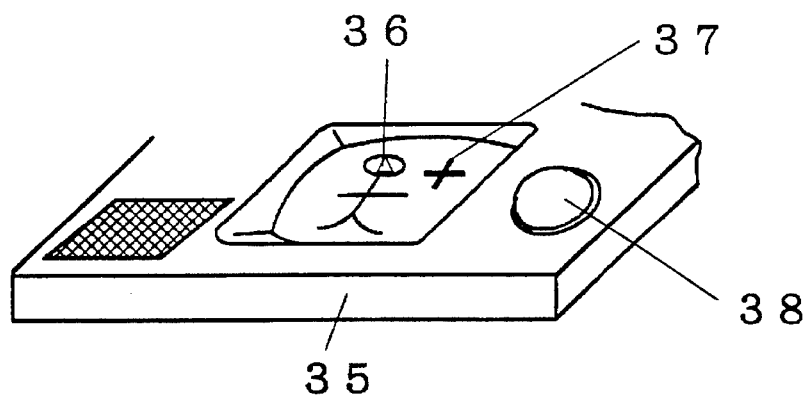
FIG. 21 illustrates the embodiment of the present inventive 3D photographic printing apparatus.

The embodiments of the present inventive three dimensional (3D) printing apparatus are explained with reference to illustrations. As shown in FIG. 20, a negative 34 inserted in the negative mask 33 is captured by a CCD camera, and the central frame of a three-frame negative is displayed as the reference image, as shown in FIG. 21, on a television monitor 35. In this embodiment, the television monitor 35 is connected to an image processing section and a CPU, and by the manipulation of a track-ball 38 and the cursor 37 can be moved.

When a principal object can be specified, the position of a key-subject 36 on the screen is specified by the cursor 37. In the image processing section, the coordinates and the image of the key-subject specified are captured, and based on the captured image information, the CCD camera scans and determines the key-subjects on the comparison images.

Figure 22:
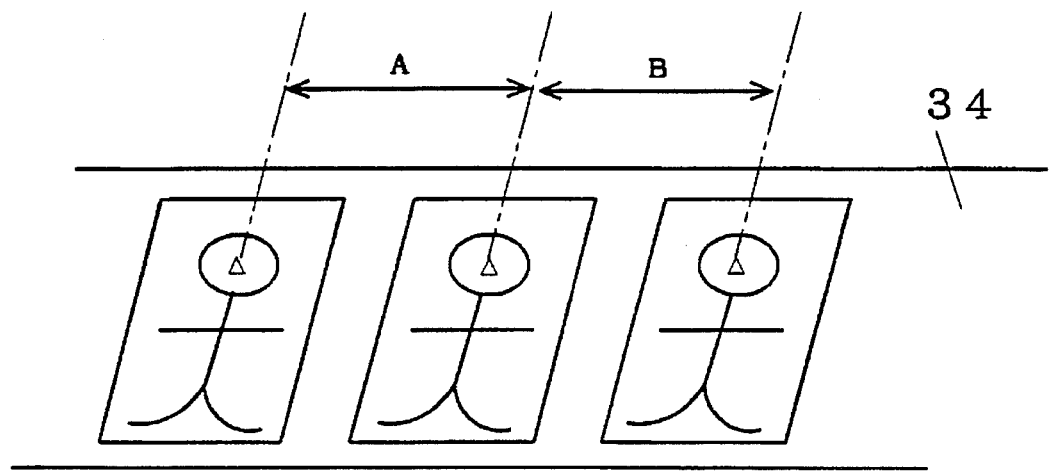
FIG. 22 illustrates the embodiment of the present inventive 3D photographic printing apparatus.

As shown in FIG. 22 by the arrows A and B, the distances between the key-subjects of the comparison images and that of the reference image are obtained, and an amount of correction is determined with reference to a threshold value that is preset.

We claim:

1. A three dimensional (3D) photographic printing method in which a lenticular sheet is used and exposure done, said photographic printing method comprising the steps of:

measuring by means of a negative detection device a position shift of a key subject for a multiple of negatives that constitute basic substances for composing a single 3D photograph, the key subject being set on a principal object for photographing;

comparing the position shift of a key subject with a predetermined threshold value;

introducing a correction for regulating the spacial parallax of a background object in the event that the shift in said key-subject set on the principal object exceeds the threshold value; and introducing a correction for regulating the spacial parallax of a foreground object in the event that the shift in the key-subject set on the principal object is below a threshold value.

* * * * *